US010793183B2

(12) United States Patent
Harter, Jr. et al.

(10) Patent No.: US 10,793,183 B2
(45) Date of Patent: Oct. 6, 2020

(54) TORQUE OVERLAY STEERING APPARATUS

(71) Applicant: TRW Automotive U.S. LLC, Livonia, MI (US)

(72) Inventors: Joseph E. Harter, Jr., Kokomo, IN (US); Kevin E. Boyle, Hermitage, TN (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 273 days.

(21) Appl. No.: 15/851,855

(22) Filed: Dec. 22, 2017

(65) Prior Publication Data

US 2019/0193777 A1    Jun. 27, 2019

(51) Int. Cl.
| B62D 5/04 | (2006.01) |
| B62D 3/04 | (2006.01) |
| B62D 5/06 | (2006.01) |
| F16H 1/20 | (2006.01) |
| B62D 3/14 | (2006.01) |

(52) U.S. Cl.
CPC ............ B62D 5/0454 (2013.01); B62D 3/04 (2013.01); B62D 3/14 (2013.01); B62D 5/0412 (2013.01); B62D 5/06 (2013.01); F16H 1/203 (2013.01)

(58) Field of Classification Search
CPC ...... B62D 5/0454; B62D 3/04; B62D 5/0412; B62D 5/0415; B62D 5/0424
See application file for complete search history.

(56) References Cited

U.S. PATENT DOCUMENTS

| 2,869,383 | A | * | 1/1959 | Rapp | B62D 5/0412 74/388 PS |
| 3,128,486 | A | * | 4/1964 | Werner | A01D 75/00 15/51 |
| 4,416,345 | A | * | 11/1983 | Barthelemy | B62D 5/0412 180/444 |
| 4,561,515 | A | * | 12/1985 | Hashimoto | B62D 5/0412 180/446 |
| 4,576,056 | A | * | 3/1986 | Barthelemy | B62D 5/0412 180/444 |
| 4,667,759 | A | * | 5/1987 | Hashimoto | B62D 5/0412 180/444 |
| 4,681,182 | A | * | 7/1987 | Suzuki | B62D 5/0412 180/444 |
| 4,732,231 | A | * | 3/1988 | Kanazawa | B62D 7/1536 180/415 |
| 4,784,234 | A | * | 11/1988 | Naito | B62D 5/0412 180/444 |
| 4,798,253 | A | * | 1/1989 | Naito | B62D 5/0412 180/404 |

(Continued)

*Primary Examiner* — Jacob D Knutson
*Assistant Examiner* — Conan D Duda
(74) *Attorney, Agent, or Firm* — Tarolli, Sundheim, Covell & Tummino LLP

(57) ABSTRACT

A steering apparatus for assisting rotation of a steering shaft in a steering system. The apparatus includes a motor having a drive shaft that rotates about a drive shaft axis and an output shaft that rotates about an output shaft axis. The output shaft axis extends parallel to the drive shaft axis. The output shaft is connected for rotation with the steering shaft. A gear train drivingly connects the motor to the output shaft. The gear train includes a worm screw and a worm wheel.

13 Claims, 4 Drawing Sheets

(56) References Cited

U.S. PATENT DOCUMENTS

| | | | | |
|---|---|---|---|---|
| 4,986,381 A * | 1/1991 | Morishita | B62D 5/0406 | 180/446 |
| 5,029,659 A * | 7/1991 | Saito | B62D 5/0412 | 180/443 |
| 5,230,397 A * | 7/1993 | Tranchon | B62D 5/0433 | 180/444 |
| 5,423,391 A * | 6/1995 | Shimizu | B62D 5/008 | 180/446 |
| 6,546,322 B2 | 4/2003 | Williams | | |
| 10,424,994 B2 * | 9/2019 | Kabune | B62D 5/0406 | |
| 2003/0000766 A1 * | 1/2003 | Tatewaki | B62D 5/0424 | 180/444 |
| 2004/0221668 A1 * | 11/2004 | Saruwatari | B62D 5/0412 | 74/388 PS |
| 2006/0054378 A1 * | 3/2006 | Tanaka | B62D 5/0424 | 180/444 |
| 2006/0060414 A1 * | 3/2006 | Kuroumaru | B62D 5/0412 | 180/444 |
| 2007/0000716 A1 * | 1/2007 | Ponziani | B62D 5/0406 | 180/444 |
| 2007/0006674 A1 * | 1/2007 | Kuroumaru | B62D 5/0412 | 74/388 PS |
| 2007/0068725 A1 * | 3/2007 | Nishizaki | B62D 5/0412 | 180/444 |
| 2007/0170787 A1 * | 7/2007 | Kuroumaru | B62D 5/0412 | 310/12.27 |
| 2007/0209861 A1 * | 9/2007 | Kruttschnitt | B62D 5/008 | 180/444 |
| 2007/0240536 A1 * | 10/2007 | Murakami | B62D 5/0409 | 74/606 R |
| 2007/0272471 A1 * | 11/2007 | Kuroumaru | B62D 5/0412 | 180/444 |
| 2008/0023257 A1 * | 1/2008 | Budaker | B62D 5/0412 | 180/444 |
| 2008/0128196 A1 * | 6/2008 | Kuroumaru | B62D 5/0412 | 180/444 |
| 2008/0156574 A1 * | 7/2008 | Otsuki | B62D 5/0409 | 180/444 |
| 2008/0236933 A1 * | 10/2008 | Kurokawa | B62D 5/0424 | 180/444 |
| 2008/0264713 A1 * | 10/2008 | Deshmukh | B62D 5/0406 | 180/446 |
| 2010/0152971 A1 | 6/2010 | Shiino et al. | | |
| 2011/0147111 A1 * | 6/2011 | Sun | B62D 5/0406 | 180/444 |
| 2011/0247440 A1 | 10/2011 | Warke | | |
| 2012/0004071 A1 * | 1/2012 | Ha | B60K 6/48 | 475/302 |
| 2012/0329592 A1 * | 12/2012 | Sun | B62D 5/0406 | 475/4 |
| 2015/0251691 A1 * | 9/2015 | Tamaizumi | B62D 5/0412 | 701/41 |
| 2015/0336604 A1 * | 11/2015 | Urababa | B62D 5/0424 | 180/444 |
| 2016/0036288 A1 * | 2/2016 | Yamasaki | B62D 5/0412 | 180/446 |
| 2016/0036289 A1 * | 2/2016 | Kawata | H02K 11/33 | 180/446 |
| 2016/0036296 A1 * | 2/2016 | Kabune | H02K 11/33 | 180/446 |
| 2016/0036303 A1 * | 2/2016 | Kadoike | H02K 11/33 | 180/443 |
| 2016/0036304 A1 * | 2/2016 | Yamasaki | B62D 5/0406 | 180/446 |
| 2016/0036305 A1 * | 2/2016 | Kawata | H02P 25/22 | 180/443 |
| 2016/0039451 A1 * | 2/2016 | Schneider | B62D 5/0481 | 180/444 |
| 2016/0068184 A1 * | 3/2016 | Kimoto | B62D 5/0454 | 180/444 |
| 2017/0029015 A1 * | 2/2017 | Nakashima | B62D 5/0412 | |
| 2017/0129534 A1 * | 5/2017 | Sone | B62D 5/0481 | |
| 2017/0174252 A1 * | 6/2017 | Hochrein | B62D 3/14 | |
| 2017/0247048 A1 * | 8/2017 | Namikawa | B62D 3/12 | |
| 2017/0346436 A1 * | 11/2017 | Hara | H02P 29/032 | |
| 2017/0350482 A1 * | 12/2017 | Asakura | B21D 9/04 | |
| 2017/0366101 A1 * | 12/2017 | Suzuki | H02P 21/22 | |
| 2018/0037253 A1 * | 2/2018 | Kano | B62D 5/0406 | |
| 2018/0037256 A1 * | 2/2018 | Maeda | B62D 15/025 | |
| 2018/0111643 A1 * | 4/2018 | Kim | B62D 15/025 | |
| 2018/0237064 A1 * | 8/2018 | Nasu | B60W 30/045 | |
| 2018/0287538 A1 * | 10/2018 | Nakashima | B62D 5/046 | |
| 2019/0074734 A1 * | 3/2019 | Tanaka | B62D 5/0403 | |
| 2019/0097565 A1 * | 3/2019 | Hayakawa | B62D 5/04 | |
| 2019/0144029 A1 * | 5/2019 | Taki | B62D 5/0463 | 318/3 |
| 2019/0144030 A1 * | 5/2019 | Sakai | B62D 5/0463 | 318/3 |
| 2019/0193777 A1 * | 6/2019 | Harter, Jr. | B62D 5/0454 | |
| 2019/0245411 A1 * | 8/2019 | Strieter | B62D 5/0406 | |

* cited by examiner

TORQUE OVERLAY STEERING APPARATUS

FIELD OF THE INVENTION

The present Invention relates to vehicle steering and, more particularly, to a steering apparatus for assisting rotation of a steering shaft in a steering system.

BACKGROUND TO THE INVENTION

It is known to provide a wheeled vehicle with a power steering system to reduce the torque a vehicle operator must apply to a steering wheel to rotate the steering wheel and cause the steerable wheels of a vehicle to turn, in order to further reduce operator effort, it is known to provide a torque overlay steering apparatus to the power steering system. A torque overlay steering apparatus reduces steering effort by applying a torque to a steering shaft that controls the power steering system. Specifically, a motor is mechanically coupled (e.g., belt drive) to the steering shaft and actuated to apply torque to the steering shaft to supplement the torque applied to the steering shaft by the operator via the steering wheel.

In certain applications, the torque overlay steering apparatus may be mounted to a steering column in a passenger compartment of the vehicle to prevent exposure of the torque overlay steering apparatus to harsh conditions that may be found In the engine bay of the vehicle. Due to this mounting arrangement, if may be important to minimize the physical dimensions of the torque overlay system so as to reduce intrusion into the passenger compartment where the operator is located. Known torque overlay steering apparatuses are deficient in that they occupy an undesirably large amount of space in the passenger compartment and/or the supplemental torque applied to the steering shaft is not high enough. For example, known torque overlay steering apparatuses employing a belt drive can only multiply the torque generated by the motor at a ratio of 3:1, which is too low for some applications.

SUMMARY OF THE INVENTION

According to one aspect of the invention, a steering apparatus for assisting rotation of a steering shaft in a power steering system Is disclosed. The apparatus includes a motor having a drive shaft that rotates about a drive shaft axis and an output shaft that rotates about an output shaft axis. The output shaft axis extends parallel to the drive shaft axis. The output shaft is connected for rotation with the steering shaft. A gear train drivingly connects the motor to the output shaft. The gear train includes a worm screw and a worm wheel.

BRIEF DESCRIPTION OF THE DRAWINGS

Embodiments of the invention will now be described by way of example only, with reference to the accompanying drawings. In which.

DETAILED DESCRIPTION

Figure 1:
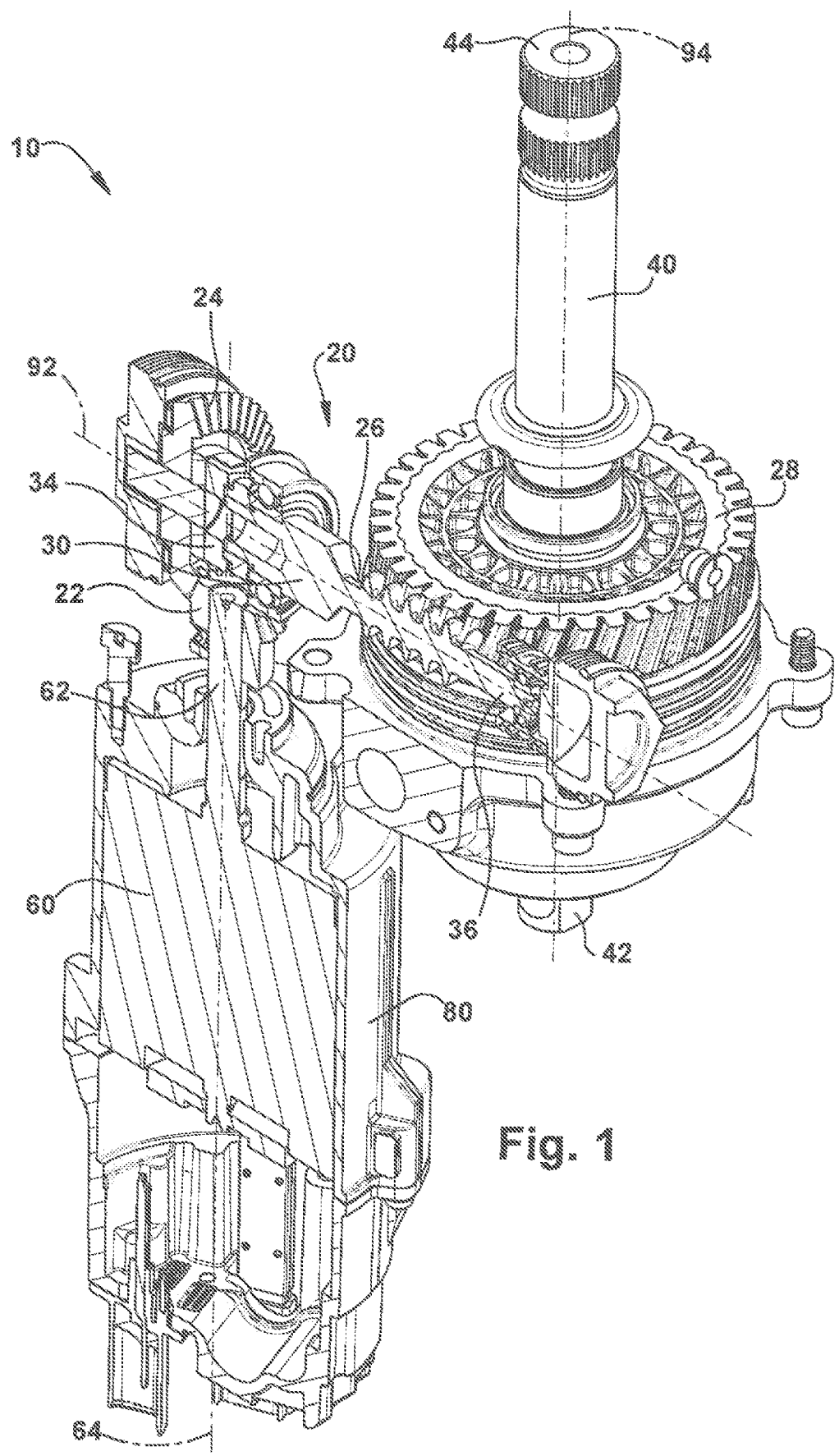
FIG. 1 is a sectional perspective view of a torque overlay steering apparatus according to the present disclosure.
Figure 2:
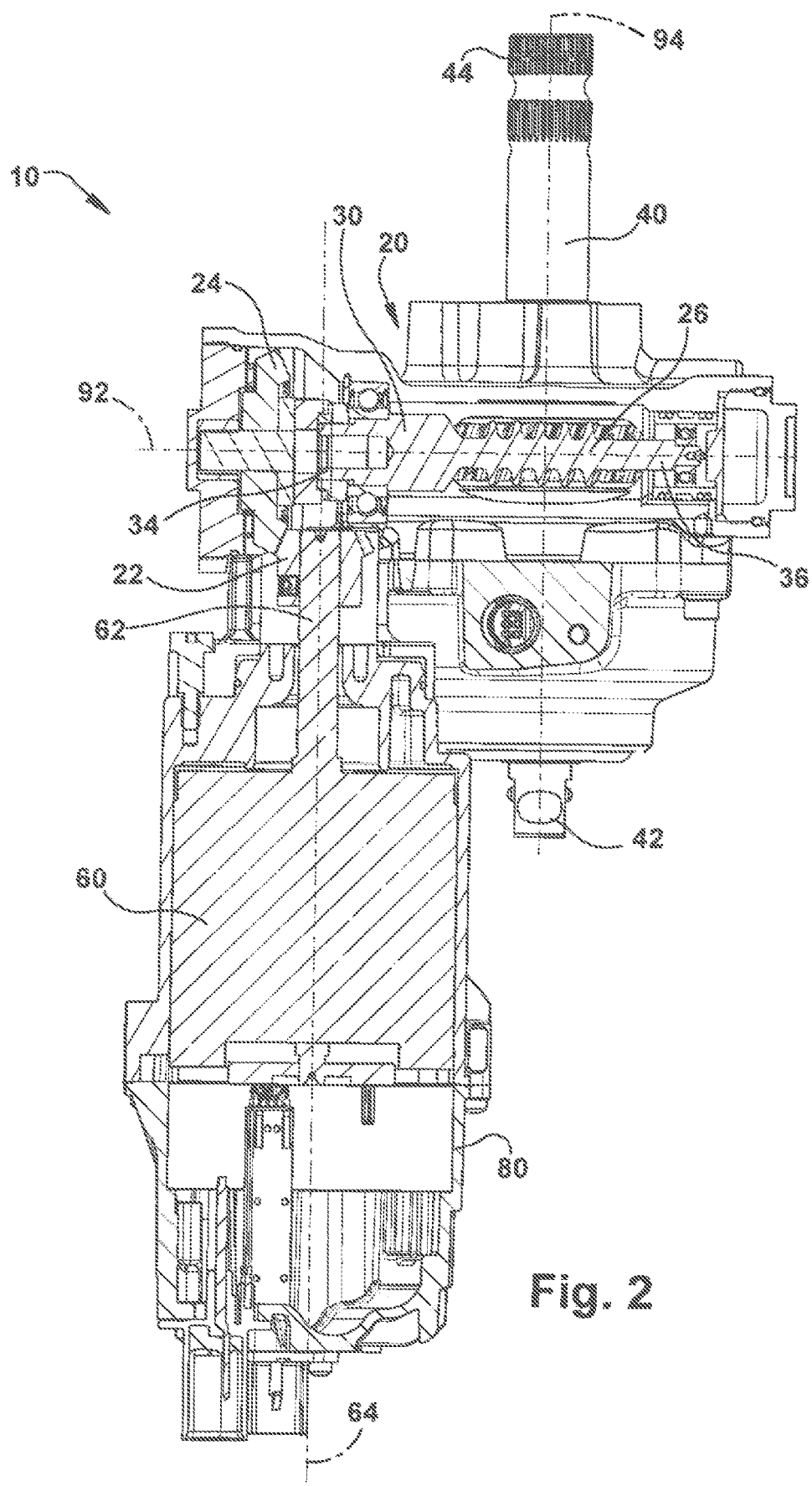
FIG. 2 is a sectional plan view of the torque overlay steering apparatus of FIG. 1.
Figure 3:
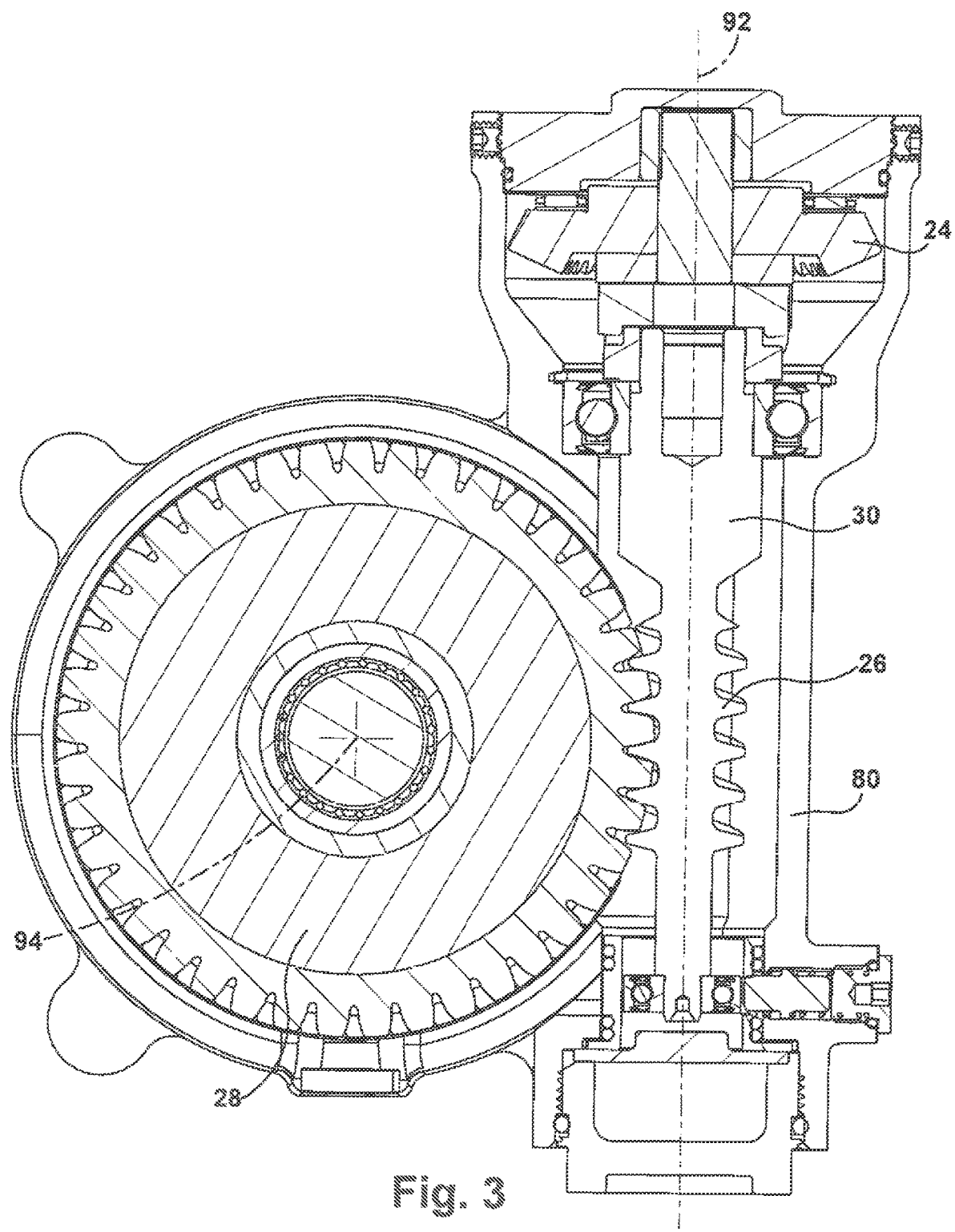
FIG. 3 is a sectional view of part of the torque overlay steering apparatus of FIG. 1 showing engagement between a worm screw and worm wheel.

A torque overlay steering apparatus 10 in accordance with the present invention is shown in FIGS. 1-3. The torque overlay steering apparatus 10 includes a gear train 20 and a motor 60 disposed in a housing 80. The gear train 20 includes a first bevel gear 22, a second bevel gear 24, a worm screw 26, and a worm wheel 28. As would be appreciated by one of ordinary skill in the art the gear train 20 is supported at various points in the housing 80 by bearings.

The first bevel gear 22 is fixed for rotation with a drive shaft 62 of the motor 60. In one example, the first bevel gear 22 is formed separately from the drive shaft 62 and subsequently attached. However, it is contemplated that the first bevel gear 22 may be formed integrally with the drive shaft 62. The drive shaft 62 extends along a drive shaft axis 64. The first bevel gear 22 rotates with the drive shaft 62 of the motor 60 about (tie drive shaft axis 64. The first bevel gear 22 meshes with the second bevel gear 24.

The second bevel gear 24 is fixed for rotation with a transfer shaft 30 that extends along a transfer shaft axis 92 between a first end 34 and a second end 36. In one example, the second bevel gear 24 is formed separately from the transfer shaft 30 and subsequently attached. However, it is contemplated that the second bevel gear 24 may be formed integrally with the transfer shaft 30. The transfer shaft axis 92 is perpendicular to the drive shaft axis 64. The second bevel gear 24 is provided at the first end 34 of the transfer shaft 30. The worm screw 26 is provided between the second bevel gear 24 and the second end 36 of the transfer shaft 30. The worm screw 26 is fixed for rotation with the transfer shaft 30. In one example, the worm screw 26 is integrally formed with the transfer shaft 30. However, it is contemplated that the worm screw 26 may be formed separately from the transfer shaft 30 and subsequently attached. The second bevel gear 24 and the worm screw 26 each rotate with the transfer shaft 30 about the transfer shaft axis 92.

The worm screw 26 meshes with the worm wheel 28. In one example, the reduction ratio provided by the worm screw 26 and the worm wheel 28 is approximately in a range of 16-22:1. At this ratio, the worm screw 26 can rotate the worm wheel 28 and the worm wheel 28 can rotate the worm screw 26 (i.e., not self-locking/).

The worm wheel 28 is concentric about and fixed for rotation with an output shaft 40. In one example, the worm wheel 28 is formed separately from the output shaft 40 and subsequently attached. However, it is contemplated that the worm wheel 28 may be formed integrally with the output shaft 40. The output shaft 40 extends along an output shaft axis 94 between a first end 42 and a second end 44. The output shaft axis 94 is perpendicular to the transfer shaft axis 92 and parallel with the drive shaft axis 64. The worm wheel 28 rotates with the output shaft 40 about the output shaft axis 94.

Figure 4:
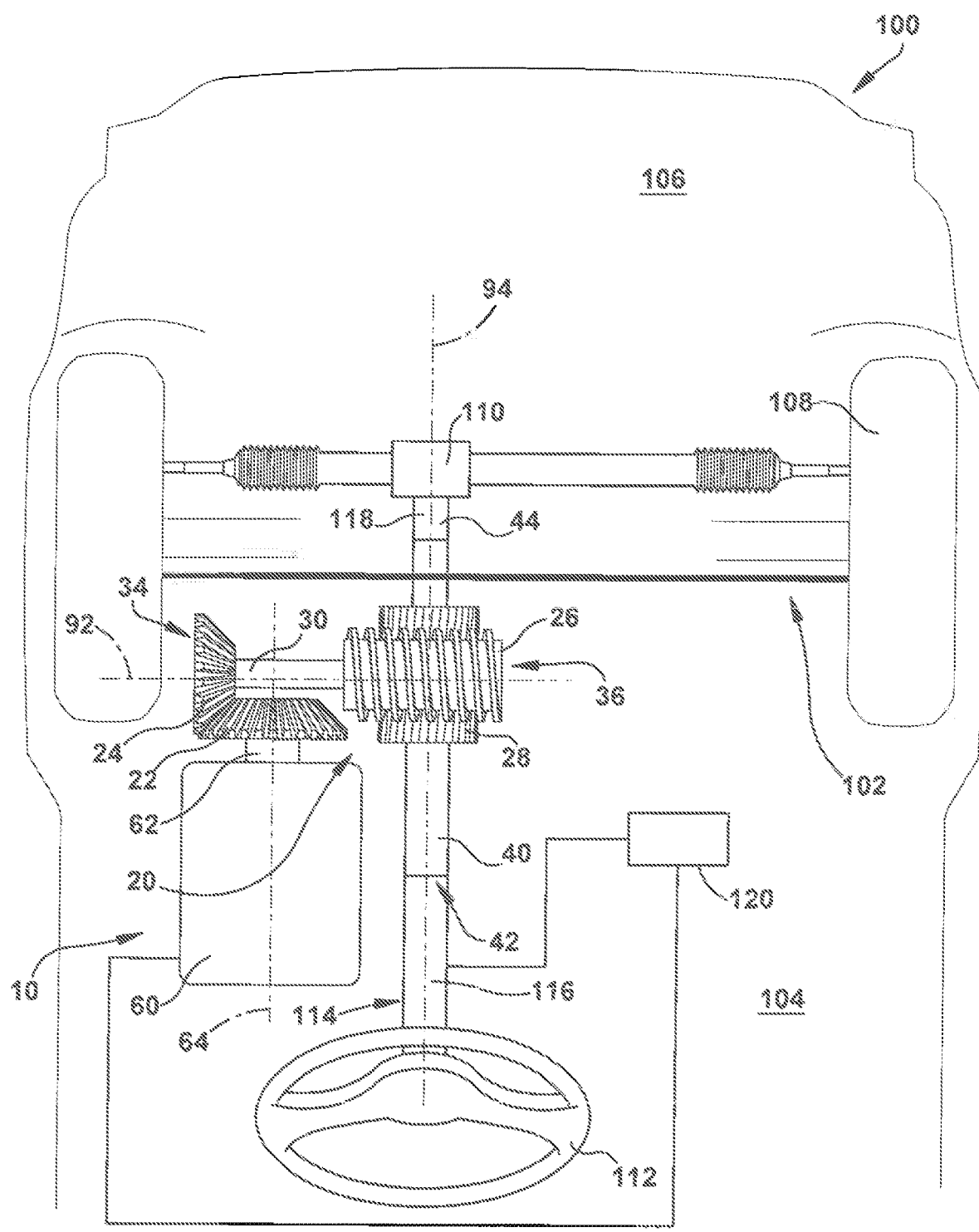
FIG. 4 is a schematic view of a vehicle equipped with the torque overlay steering apparatus of FIG. 1.

A vehicle 100 equipped with the torque overlay steering apparatus 10 is shown in FIG. 4. A firewall 102 separates the vehicle 100 into a passenger compartment space 104 and an engine bay space 106. The torque overlay steering apparatus 10 is provided In the passenger compartment space 104 and mounted to a steering shaft 114. The vehicle 100 includes steerable wheels 108 that can be turned by a hydraulic power steering system 110. The hydraulic power steering system 110 is provided in the engine bay space 106. In one example, the hydraulic power steering system 110 is of the rack and pinion type. However, it is contemplated that other types of hydraulic power steering systems may be used (e.g., recirculating ball). Additionally, it Is contemplated that other types of power steering systems besides hydraulic may be used.

The hydraulic power steering system 110 and the torque overlay steering apparatus 10 are controlled by a steering wheel 112. The steering wheel 112 is provided in the passenger compartment space 104. The steering wheel 112 can be rotated by an operator of the vehicle 100 to effect turning of the steerable wheels 108.

The steering shaft 114 extends through the firewall 102 to Interconnect the steering wheel 112 to the hydraulic power steering system 110. The steering shaft 114 transfers rotation of the steering wheel 112 to the hydraulic power steering system 110 to direct the hydraulic power steering system 110 to turn the steerable wheels 108. A control unit 120 is provided for sensing operator input via the steering wheel 112. The control unit 120 can for example, sense torque applied to the steering wheel 112, steering wheel 112 rotation angle, and/or angular velocity of the steering wheel 112. In one example, the control unit 120 can sense operator input by monitoring the steering shaft 114. However, it is contemplated that the control unit 120 may sense operator input by directly monitoring the steering wheel 112.

The steering shaft 114 can include a first part 116 and a separate second part 118. The first part 116 of the steering shaft 114 is attached for rotation with the steering wheel 112. The second part 118 of the steering shaft 114 is rotatably attached to the hydraulic power steering system 110. The torque overlay steering apparatus 10 is integrated into the steering shaft 114 such that first part 116 of the steering shaft 114 is attached to the first and 42 of the output shaft 40 and the second part 118 of the steering shaft 114 is attached to the second end 44 of the output shaft 40. It is contemplated that other arrangements of the steering shaft 114 and the torque overlay steering apparatus 10 may be provided. For example, the orientation of the torque overlay steering apparatus 10 relative to the steering shaft 114 may be flipped such that the first end 42 of the output shaft 40 is attached to the second part 118 of the steering shaft 114 and the second end 44 of the output shaft 40 is attached to the first part 116 of the steering shaft 114. As another example, the output shaft 40 may be provided at a terminal end of a multi-piece (or single piece) steering shaft. That is, the output shaft 40 may be connected directly to the steering wheel 112 and the steering shaft. Alternatively, the output shaft 40 may be connected directly to the power steering system 110 and the steering shaft. As yet another example, the torque overlay steering apparatus 10 may be Integrated into a steering shaft having more than two separate parts.

During the course of operation of the vehicle 100, an operator may provide input via the steering wheel 112 to apply torque to the steering shaft 114 and effect turning of the steerable wheels 108. The control unit 120 senses the operator input and communicates the sensed input to the torque overlay steering apparatus 10. The motor 60 is energized in response to the sensed input, thereby causing the drive shaft 62 to rotate the first bevel gear 22 about the drive shaft axis 64. Rotation of the first bevel gear 22, which is in mesh with the second bevel gear 24, causes the second bevel gear 24 to rotate about the transfer shaft axis 92. The transfer shaft 30 transfers rotation of the second bevel gear 24 to the worm screw 26, thereby causing the worm screw 26 to also rotate about the transfer shaft axis 92. Rotation of the worm screw 26, which is in mesh with the worm wheel 28, results in the application of torque to the worm wheel 28. The applied torque transfers from the worm wheel 28 to the output shaft 40 and then to the steering shaft 114. Thus, the torque overlay steering apparatus 10 supplements the torque applied to the steering shaft 114. The combined torque applied to the steering shaft 114 (i.e., torque applied by the operator and torque applied by the torque overlay steering apparatus) causes the sleeting shaft 114 to rotate, thereby actuating the hydraulic power steering system 110 and turning the steerable wheels 108 as is known in the art.

The arrangement of the torque overlay steering apparatus 10 allows the axis of rotation of the drive shaft 62 of the electric motor 90 (i.e., the drive shaft axis 64) to extend parallel to the axis of rotation of the output shaft 40 (i.e., the output shaft axis 94), thereby providing an extremely compact assembly that occupies minimal space in the passenger compartment space 104 of the vehicle 100. Additionally, the gear train 20 provides an extremely high reduction ratio, thus providing a significant multiplication of the torque generated by the motor 60. In one example, the reduction ratio provided by the gear train 20 is 40:1. However, it is contemplated that other reduction ratios may be provided. At a reduction ratio of 40:1, the torque overlay steering apparatus 10 can enable an operator to safely maneuver a vehicle in the event of hydraulic power steering failure (i.e., the steerable wheels 108 can be turned even when the hydraulic power steering system 110 fails).

From the above description of the invention, those skilled in the art will perceive improvements, changes and modifications. For example, although the torque overlay steering apparatus 10 has been described as being used with a hydraulic power steering system, it is contemplated that the torque overlay steering apparatus may be used with other types of power steering systems. As another example, although the torque overlay steering apparatus 10 has been described as being used in conjunction with another steering system, it is contemplated that the torque overlay steering apparatus may be the sole mechanism by which assistance of turning of the steerable wheels 108 is provided (i.e., omitting the hydraulic power steering system 110). Such improvements, changes and modifications within the skill of the art are intended to be covered by the appended claims.

The invention claimed is:

1. A steering apparatus for assisting rotation of a steering shaft in a steering system, the apparatus comprising:
   a motor having a drive shaft that rotates about a drive shaft axis;
   an output shaft that rotates about an output shaft axis, the output shaft axis extending parallel to the drive shaft axis, the output shaft being connected for rotation with the steering shaft; and
   a gear train drivingly connecting the motor to the output shaft, the gear train including a worm screw and a worm wheel, wherein the gear train further includes a first gear provided on the drive shaft and being rotatable by the motor about the drive shaft axis, and a second gear driven by the first gear and rotatable with the worm screw for transferring rotation of the first gear to the worm screw.

2. The apparatus of claim 1, wherein the second gear rotates about an axis that extends perpendicular to the drive shaft axis.

3. The apparatus of claim 1, wherein the first gear and the second gear are bevel gears.

4. The apparatus of claim 1, wherein the worm screw rotates about the axis of rotation of the second gear.

5. The apparatus of claim 1 including a shaft that transfers rotation of the second gear to the worm screw.

6. The apparatus of claim 5, wherein the shaft that transfers rotation of the second gear to the worm screw extends along the axis of rotation of the second gear.

7. The apparatus of claim 6, wherein the axis of rotation of the second gear is perpendicular to the drive shaft axis and the output shaft axis.

8. The apparatus of claim 1, wherein the worm wheel is concentric about the output shaft.

9. The apparatus of claim 1, wherein the steering shaft connects a steering wheel to the steering system, and wherein a controller detects rotation of the steering wheel, the motor being energized to rotate the drive shaft in response to the controller detecting rotation of the steering wheel.

10. The apparatus of claim 1, wherein the reduction ratio of the gear train is at least 40:1.

11. The apparatus of claim 1, wherein the steering system is a power steering system.

12. The apparatus of claim 11, wherein the power steering system is hydraulic.

13. The apparatus of claim 1, wherein the second gear and the worm screw are provided on opposite ends of a transfer shaft.

\* \* \* \* \*